US011296827B2

(12) United States Patent
Yang et al.

(10) Patent No.: US 11,296,827 B2
(45) Date of Patent: Apr. 5, 2022

(54) FEEDBACK MODE INDICATION FOR COORDINATED TRANSMISSION

(71) Applicant: QUALCOMM Incorporated, San Diego, CA (US)

(72) Inventors: Wei Yang, San Diego, CA (US); Yi Huang, San Diego, CA (US); Peter Gaal, San Diego, CA (US); Wanshi Chen, San Diego, CA (US); Joseph Binamira Soriaga, San Diego, CA (US); Gokul Sridharan, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 130 days.

(21) Appl. No.: 16/523,911

(22) Filed: Jul. 26, 2019

(65) Prior Publication Data

US 2020/0036480 A1 Jan. 30, 2020

Related U.S. Application Data

(60) Provisional application No. 62/711,157, filed on Jul. 27, 2018.

(51) Int. Cl.
*G08C 25/02* (2006.01)
*H04L 1/18* (2006.01)
(Continued)

(52) U.S. Cl.
CPC .......... *H04L 1/1812* (2013.01); *H04L 1/0073* (2013.01); *H04L 1/1607* (2013.01); *H04W 76/27* (2018.02)

(58) Field of Classification Search
CPC ..... H04L 1/00; H04L 1/16; H04L 1/18; H04L 1/0073; H04L 1/1607; H04L 1/1812;
(Continued)

(56) References Cited

U.S. PATENT DOCUMENTS 9,537,614 B2 * 1/2017 Liang .................... H04L 5/0055
9,554,299 B2 * 1/2017 Seo ...................... H04W 72/042
(Continued)

FOREIGN PATENT DOCUMENTS

EP         2624494 A2    8/2013
WO   WO-2017168039 A1 * 10/2017 ........... H04L 1/1854

OTHER PUBLICATIONS

ASUSTEK: "Discussion on Multi-TRP DL Transmission", 3GPP Draft; R1-1716546; France, vol. RAN WG1, No. Nagoya, Japan; Sep. 17, 2017; pp. 2-3. (Year: 2017).*
(Continued)

*Primary Examiner* — Albert Decady
*Assistant Examiner* — Enamul M Kabir
(74) *Attorney, Agent, or Firm* — Patterson+ Sheridan, L.L.P.

(57) ABSTRACT

Certain aspects of the present disclosure provide techniques for wireless communication. The techniques include a method wireless communication by a user equipment including receiving a configuration message, wherein the configuration message in part configures the UE to communicate coordinated transmissions with a plurality of transmission reception points using a coordinated transmission mode. The method further includes, receiving one or more physical downlink shared channel transmissions from a plurality of transmission reception points in accordance with the coordinated transmission mode. The method further includes, selecting a HARQ-ACK feedback mode based in part on the coordinated transmission mode. The method further includes, transmitting HARQ-ACK feedback to at least one of the plurality of transmission reception points using the selected HARQ-ACK feedback mode.

27 Claims, 10 Drawing Sheets

(51) Int. Cl.
*H04W 76/27* (2018.01)
*H04L 1/00* (2006.01)
*H04L 1/16* (2006.01)

(58) Field of Classification Search
CPC ... H04L 1/1829; H04L 1/1861; H04L 1/1896; H04B 7/024; H04B 7/0645; H04W 76/27
See application file for complete search history.

(56) References Cited

U.S. PATENT DOCUMENTS

| | | | | |
|---|---|---|---|---|
| 9,763,151 | B2* | 9/2017 | Kim | H04W 76/15 |
| 9,888,493 | B2* | 2/2018 | Park | H04W 72/1289 |
| 10,735,146 | B2* | 8/2020 | Wang | H04L 1/1671 |
| 10,925,047 | B2* | 2/2021 | Islam | H04L 1/0031 |
| 2008/0310338 | A1* | 12/2008 | Charpenter | H04L 1/1671 370/315 |
| 2011/0267995 | A1* | 11/2011 | Li | H04L 1/1614 370/280 |
| 2012/0026935 | A1* | 2/2012 | Park | H04L 1/1854 370/315 |
| 2012/0314671 | A1* | 12/2012 | Noh | H04L 5/0048 370/329 |
| 2012/0320805 | A1* | 12/2012 | Yang | H04L 1/1861 370/280 |
| 2013/0294369 | A1* | 11/2013 | Dinan | H04W 72/0466 370/329 |
| 2015/0085714 | A1* | 3/2015 | Liang | H04L 1/1614 370/280 |
| 2015/0381254 | A1* | 12/2015 | Liang | H04B 7/024 370/329 |
| 2016/0105882 | A1* | 4/2016 | Park | H04L 5/0053 370/329 |
| 2016/0204924 | A1* | 7/2016 | Li | H04L 5/0053 370/280 |
| 2016/0345199 | A1* | 11/2016 | Nogami | H04W 76/27 |
| 2017/0134140 | A1* | 5/2017 | Park | H04L 1/0046 |
| 2017/0272219 | A1* | 9/2017 | Park | H04W 48/08 |
| 2017/0272220 | A1* | 9/2017 | Chen | H04B 7/024 |
| 2018/0020444 | A1* | 1/2018 | Lee | H04W 72/0413 |
| 2018/0034612 | A1* | 2/2018 | Lin | H04B 17/345 |
| 2019/0081750 | A1* | 3/2019 | Yang | H04L 5/0048 |
| 2019/0132893 | A1* | 5/2019 | Lu | H04W 76/14 |
| 2019/0215044 | A1* | 7/2019 | Noh | H04B 7/0626 |
| 2019/0246378 | A1* | 8/2019 | Islam | H04W 72/042 |
| 2019/0319751 | A1* | 10/2019 | Chen | H04L 1/1825 |
| 2019/0342905 | A1* | 11/2019 | Ren | H04L 1/001 |
| 2019/0393994 | A1* | 12/2019 | Liang | H04L 1/1678 |
| 2020/0178332 | A1* | 6/2020 | Sharma | H04W 80/08 |
| 2020/0304248 | A1* | 9/2020 | Lunttila | H04L 1/1864 |

OTHER PUBLICATIONS

NTT DOCOMO et al.: "DUUL scheduling and HARQ management", 3GPP Draft; R1-1718217; France, vol. RAN WG1, No. Prague, CZ; Oct. 9, 2017; pp. 19. (Year: 2017).*

Huawei et al.: "Solution and TP for multi-TRP PDCCH transmission", 3GPP Draft; R1-1800824; France, vol. RAN WG1, No. Vancouver, Canada; Jan. 13, 2018; pp. 3. (Year: 2018).*

ERICSSON: "On Multi-TRP and Multi-panel Transmission," 3GPP Draft; R1-1708673, 3rd Generation Partnership Project (3GPP), Mobile Competence Centre; 650, Route des Lucioles; F-06921 Sophia-Antipolis Cedex; France, vol. RAN WG1, No. Hangzhou, China; May 15, 2017-May 19, 2017, May 14, 2017, XP051273856, 5 pages, Retrieved from the Internet: URL: http://www.3gpp.org/ftp/Meetings_3GPP_SYNC/RAN1/Docs/[retrieved on May 14, 2017] section 1 section 2.2 section 3.1.

Interdigital Inc: "NR-PDCCH Design for Multi-TRP Transmission," 3GPP Draft; R1-1716465 NR-PDCCH Design for Multi-TRP Transmission, 3rd Generation Partnership Project (3GPP), Mobile Competence Centre; 650, Route des Lucioles; F-06921 Sophia-Antipolis Cedex; France, vol. RAN WG1, No. Nagoya, Japan; Sep. 18, 2017-Sep. 21, 2017, Sep. 17, 2017, XP051339918, 3 Pages, Retrieved from the Internet: URL: http://www.3gpp.org/ftp/Meetings_3GPP_SYNC/RAN1/Docs/[retrieved on Sep. 17, 2017] section 2.

International Search Report and Written Opinion—PCT/US2019/043816—ISA/EPO—dated Oct. 28, 2019.

ASUSTEK: "Discussion on Multi-TRP DL Transmission", 3GPP Draft; R1-1716546 Discussion on Multi-TRP DL Transmission, 3rd Generation Partnership Project (3GPP), Mobile Competence Centre ; 650, Route des Lucioles ; F-06921 Sophia-Antipolis Cedex ; France, vol. RAN WG1, No. Nagoya, Japan; Sep. 18, 2017-Sep. 21, 2017, Sep. 17, 2017 (Sep. 17, 2017), XP051339999, 3 Pages, Retrieved from the Internet: URL:http://www.3gpp.org/ftp/Meetings_3GPP_SYNC/RAN1/Docs/ [retrieved on Sep. 17, 2017], Section 2.

Huawei et al.: "Solution and TP for Multi-TRP PDCCH Transmission," 3GPP Drat; R1-1800824, 3rd Generation Partnership Project (3GPP), Mobile Competence Centre; 650, Route des Lucioles; F-06921 Sophia-Antipolis Cedex; France, vol. RAN WG1, No. Vancouver, Canada; Jan. 22, 2018-Jan. 26, 2018, Jan. 13, 2018, XP051385096, 5 pages, Retrieved from the Internet: URL: http://www.3gpp.org/ftp/tsg%5Fran/WG1%5FRL1/TSGR1%5FAH/NR%5FAH%5F1801/Docs/[retrieved on Jan. 13, 2018] p. 3.

NTT DOCOMO et al., "DL/UL Scheduling and HARQ management", 3GPP Draft; R1-1718217, 3rd Generation Partnership Project (3GPP), Mobile Competence Centre, 650, Route des Lucioles, F-06921 Sophia-Antipolis Cedex, France, vol. RAN WG1, No. Prague. CZ; Oct. 9, 2017-Oct. 13, 2017, Oct. 8, 2017 (Oct. 8, 2017), XP051352925, pp. 1-14, Retrieved from the Internet: URL: https://www.3gpp.org/ftp/TSG_RAN/WG1_RL1/TSGR1_90b/Docs and https://www.3gpp.org/ftp/TSG_RAN/WG1_RL1/TSGR1_90b/Docs [retrieved on Oct. 3, 2017], p. 6.

AT&T: "Remaining Details onSupporting Multi-TRP Transmission and Reception", 3GPP Draft, R1-1716165, 3GPP TSG RAN WG1 Meeting NR#3, RemainingDetails on Supporting Multi-TRP Transmission and Reception, 3rd Generation PartnershipProject (3GPP), Mobile Competence Centre, 650, Route des Lucioles, F-06921 SOPvol. RAN NG1, No. Nagoya, Japan, Sep. 18, 2017-Sep. 21, 2017, Sep. 17, 2017(Sep. 17, 2017), XP051339623, pp. 1-4.

* cited by examiner

FEEDBACK MODE INDICATION FOR COORDINATED TRANSMISSION

CLAIM OF PRIORITY UNDER 35 U.S.C. § 119

The present application for patent claims benefit of U.S. Provisional Patent Application Ser. No. 62/711,157, filed Jul. 27, 2018, assigned to the assignee hereof and hereby expressly incorporated by reference herein.

FIELD

Aspects of the present disclosure relate to wireless communications, and more particularly, to techniques for providing different acknowledgment/negative (ACK/NACK) feedback modes for coordinated transmissions from multiple transmission reception points (TRPs).

BACKGROUND

Wireless communication systems are widely deployed to provide various telecommunication services such as telephony, video, data, messaging, broadcasts, etc. These wireless communication systems may employ multiple-access technologies capable of supporting communication with multiple users by sharing available system resources (e.g., bandwidth, transmit power, etc.). Examples of such multiple-access systems include 3rd Generation Partnership Project (3GPP) Long Term Evolution (LTE) systems, LTE Advanced (LTE-A) systems, code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems, to name a few.

In some examples, a wireless multiple-access communication system may include a number of base stations (BSs), which are each capable of simultaneously supporting communication for multiple communication devices, otherwise known as user equipments (UEs). In an LTE or LTE-A network, a set of one or more base stations may define an eNodeB (eNB). In other examples (e.g., in a next generation, a new radio (NR), or 5G network), a wireless multiple access communication system may include a number of distributed units (DUs) (e.g., edge units (EUs), edge nodes (ENs), radio heads (RHs), smart radio heads (SRHs), transmission reception points (TRPs), etc.) in communication with a number of central units (CUs) (e.g., central nodes (CNs), access node controllers (ANCs), etc.), where a set of one or more distributed units, in communication with a central unit, may define an access node (e.g., which may be referred to as a base station, 5G NB, next generation NodeB (gNB or gNodeB), TRP, etc.). A base station or distributed unit may communicate with a set of UEs on downlink channels (e.g., for transmissions from a base station or to a UE) and uplink channels (e.g., for transmissions from a UE to a base station or distributed unit).

These multiple access technologies have been adopted in various telecommunication standards to provide a common protocol that enables different wireless devices to communicate on a municipal, national, regional, and even global level. New Radio (NR) (e.g., 5G) is an example of an emerging telecommunication standard. NR is a set of enhancements to the LTE mobile standard promulgated by 3GPP. It is designed to better support mobile broadband Internet access by improving spectral efficiency, lowering costs, improving services, making use of new spectrum, and better integrating with other open standards using OFDMA with a cyclic prefix (CP) on the downlink (DL) and on the uplink (UL). To these ends, NR supports beamforming, multiple-input multiple-output (MIMO) antenna technology, and carrier aggregation.

However, as the demand for mobile broadband access continues to increase, there exists a need for further improvements in NR and LTE technology. Preferably, these improvements should be applicable to other multi-access technologies and the telecommunication standards that employ these technologies.

BRIEF SUMMARY

The systems, methods, and devices of the disclosure each have several aspects, no single one of which is solely responsible for its desirable attributes. Without limiting the scope of this disclosure as expressed by the claims which follow, some features will now be discussed briefly. After considering this discussion, and particularly after reading the section entitled "Detailed Description" one will understand how the features of this disclosure provide advantages that include improved communications between access points and stations in a wireless network.

Certain aspects provide a method wireless communication. The method generally includes receiving a configuration message, wherein the configuration message in part configures the UE to communicate coordinated transmissions with a plurality of transmission reception points (TRPs) using a coordinated transmission mode, receiving one or more physical downlink shared channel (PDSCH) transmissions from a plurality of transmission reception points (TRPs) in accordance with the coordinated transmission mode, selecting a hybrid automatic repeated request (HARQ) Acknowledgment (HARQ-ACK) feedback mode, from at least first and second HARQ-ACK feedback modes, based in part on the coordinated transmission mode, and transmitting HARQ-ACK feedback for the at least one or more PDSCH transmissions to at least one of the plurality of TRPs using the selected HARQ-ACK feedback mode.

Aspects of the present disclosure provide a method for wireless communication by a network entity. The method generally includes sending a configuration message to a user equipment (UE), wherein the configuration message in part configures the UE to communicate coordinated transmissions with a plurality of transmission reception points (TRPs) using a coordinated transmission mode, transmitting one or more physical downlink shared channel (PDSCH) transmissions from a plurality of transmission reception points (TRPs) in accordance with the coordinated transmission mode, determining a hybrid automatic repeated request (HARQ) Acknowledgment (HARQ-ACK) feedback mode, selected from at least first and second HARQ-ACK feedback modes, based in part on the coordinated transmission mode, and receiving HARQ-ACK feedback for the at least one or more PDSCH transmissions to at least one of the plurality of TRPs using the determined HARQ-ACK feedback mode Certain aspects also provide various apparatus, means, and computer readable medium for performing the operations described above.

To the accomplishment of the foregoing and related ends, the one or more aspects comprise the features hereinafter fully described and particularly pointed out in the claims. The following description and the appended drawings set forth in detail certain illustrative features of the one or more aspects. These features are indicative, however, of but a few of the various ways in which the principles of various aspects may be employed.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the drawings. It is to be noted, however, that the appended drawings illustrate only certain typical aspects of this disclosure and are therefore not to be considered limiting of its scope, for the description may admit to other equally effective aspects.

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

Figure 1:
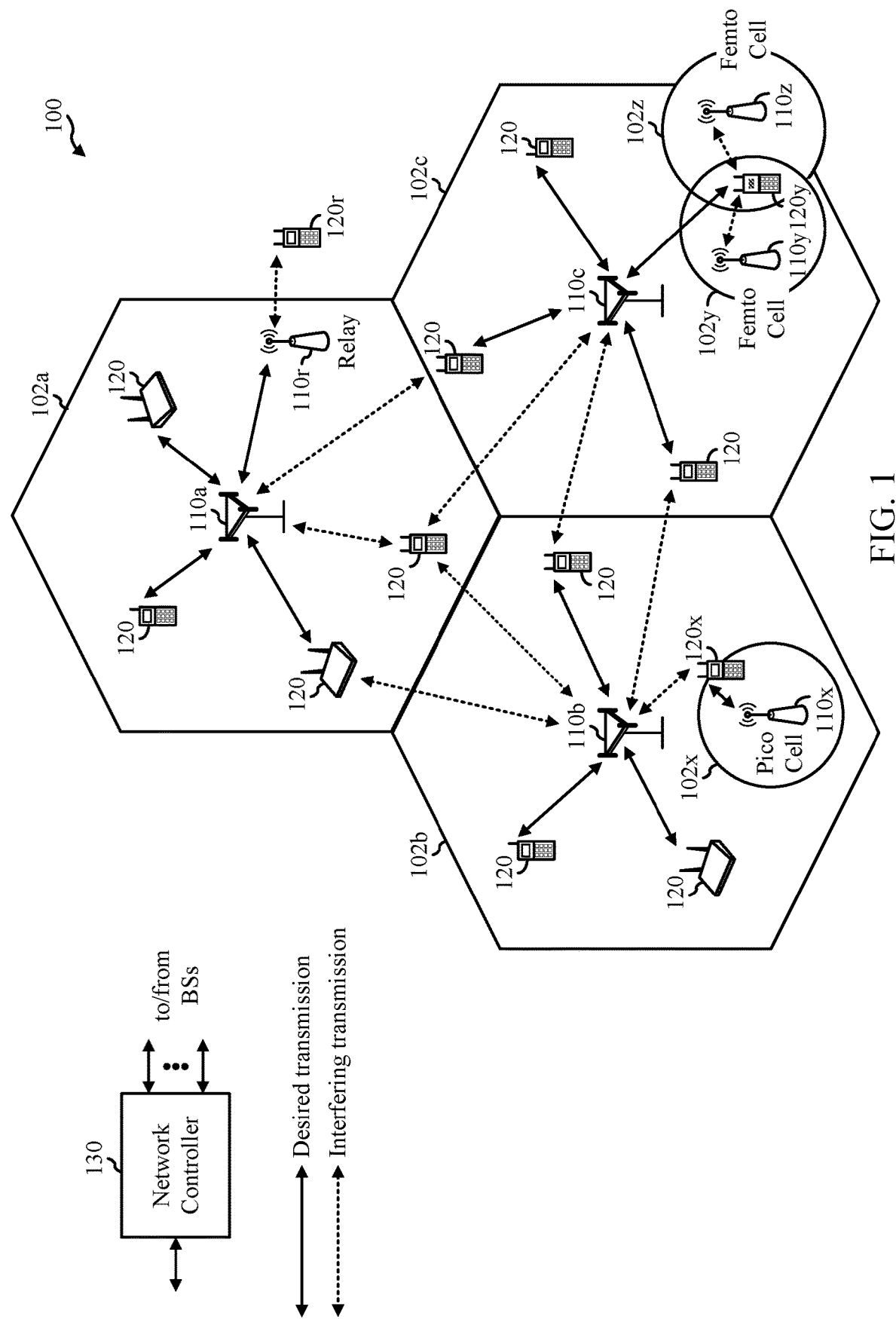
FIG. 1 is a block diagram conceptually illustrating an example telecommunications system, in accordance with certain aspects of the present disclosure.

Aspects of the present disclosure provide apparatus, methods, processing systems, and computer readable mediums for providing different acknowledgment/negative (ACK/NACK) feedback modes for coordinated transmission from multiple transmission reception points (TRPs).

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method which is practiced using other structure, functionality, or structure and functionality in addition to, or other than, the various aspects of the disclosure set forth herein. It should be understood that any aspect of the disclosure disclosed herein may be embodied by one or more elements of a claim. The word "exemplary" is used herein to mean "serving as an example, instance, or illustration." Any aspect described herein as "exemplary" is not necessarily to be construed as preferred or advantageous over other aspects.

The techniques described herein may be used for various wireless communication technologies, such as LTE, CDMA, TDMA, FDMA, OFDMA, SC-FDMA and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as NR (e.g. 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS).

New Radio (NR) is an emerging wireless communications technology under development in conjunction with the 5G Technology Forum (5GTF). 3GPP Long Term Evolution (LTE) and LTE-Advanced (LTE-A) are releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). The techniques described herein may be used for the wireless networks and radio technologies mentioned above as well as other wireless networks and radio technologies. For clarity, while aspects may be described herein using terminology commonly associated with 3G and/or 4G wireless technologies, aspects of the present disclosure can be applied in other generation-based communication systems, such as 5G and later, including NR technologies.

New radio (NR) access (e.g., 5G technology) may support various wireless communication services, such as enhanced mobile broadband (eMBB) targeting wide bandwidth (e.g., 80 MHz or beyond), millimeter wave (mmW) targeting high carrier frequency (e.g., 25 GHz or beyond), massive machine type communications MTC (mMTC) targeting non-backward compatible MTC techniques, and/or mission critical targeting ultra-reliable low-latency communications (URLLC). These services may include latency and reliability requirements. These services may also have different transmission time intervals (TTI) to meet respective quality of service (QoS) requirements. In addition, these services may co-exist in the same subframe.

Example Wireless Communications System

FIG. 1 illustrates an example wireless communication network 100 in which aspects of the present disclosure may be performed. For example, the wireless communication network 100 may be a New Radio (NR) or 5G network. For example, a UE 120 in FIG. 1 may be configured to perform operations of FIG. 8 to provide acknowledgment feedback according to one of different modes for coordinated transmissions from multiple transmission reception points (TRPs). One or more base stations 110 may configure a UE for such operations and may control the multiple TRPs involved in the coordinated transmissions (e.g., by performing operations of FIG. 9).

As illustrated in FIG. 1, the wireless network 100 may include a number of base stations (BSs) 110 and other network entities. A BS may be a station that communicates with user equipments (UEs). Each BS 110 may provide communication coverage for a particular geographic area. In 3GPP, the term "cell" can refer to a coverage area of a Node B (NB) and/or a Node B subsystem serving this coverage area, depending on the context in which the term is used. In NR systems, the term "cell" and next generation NodeB (gNB), new radio base station (NR BS), 5G NB, access point (AP), or transmission reception point (TRP) may be interchangeable. In some examples, a cell may not necessarily be stationary, and the geographic area of the cell may move according to the location of a mobile BS. In some examples, the base stations may be interconnected to one another and/or to one or more other base stations or network nodes (not shown) in wireless communication network 100 through various types of backhaul interfaces, such as a direct physical connection, a wireless connection, a virtual network, or the like using any suitable transport network.

In general, any number of wireless networks may be deployed in a given geographic area. Each wireless network may support a particular radio access technology (RAT) and may operate on one or more frequencies. A RAT may also be referred to as a radio technology, an air interface, etc. A frequency may also be referred to as a carrier, a subcarrier, a frequency channel, a tone, a subband, etc. Each frequency may support a single RAT in a given geographic area in order to avoid interference between wireless networks of different RATs. In some cases, NR or 5G RAT networks may be deployed.

A base station (BS) may provide communication coverage for a macro cell, a pico cell, a femto cell, and/or other types of cells. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having an association with the femto cell (e.g., UEs in a Closed Subscriber Group (CSG), UEs for users in the home, etc.). A BS for a macro cell may be referred to as a macro BS. A BS for a pico cell may be referred to as a pico BS. A BS for a femto cell may be referred to as a femto BS or a home BS. In the example shown in FIG. 1, the BSs 110a, 110b and 110c may be macro BSs for the macro cells 102a, 102b and 102c, respectively. The BS 110x may be a pico BS for a pico cell 102x. The BSs 110y and 110z may be femto BSs for the femto cells 102y and 102z, respectively. A BS may support one or multiple (e.g., three) cells.

Wireless communication network 100 may also include relay stations. A relay station is a station that receives a transmission of data and/or other information from an upstream station (e.g., a BS or a UE) and sends a transmission of the data and/or other information to a downstream station (e.g., a UE or a BS). A relay station may also be a UE that relays transmissions for other UEs. In the example shown in FIG. 1, a relay station 110r may communicate with the BS 110a and a UE 120r in order to facilitate communication between the BS 110a and the UE 120r. A relay station may also be referred to as a relay BS, a relay, etc.

Wireless network 100 may be a heterogeneous network that includes BSs of different types, e.g., macro BS, pico BS, femto BS, relays, etc. These different types of BSs may have different transmit power levels, different coverage areas, and different impact on interference in the wireless network 100. For example, macro BS may have a high transmit power level (e.g., 20 Watts) whereas pico BS, femto BS, and relays may have a lower transmit power level (e.g., 1 Watt).

Wireless communication network 100 may support synchronous or asynchronous operation. For synchronous operation, the BSs may have similar frame timing, and transmissions from different BSs may be approximately aligned in time. For asynchronous operation, the BSs may have different frame timing, and transmissions from different BSs may not be aligned in time. The techniques described herein may be used for both synchronous and asynchronous operation.

A network controller 130 may couple to a set of BSs and provide coordination and control for these BSs. The network controller 130 may communicate with the BSs 110 via a backhaul. The BSs 110 may also communicate with one another (e.g., directly or indirectly) via wireless or wireline backhaul.

The UEs 120 (e.g., 120x, 120y, etc.) may be dispersed throughout the wireless network 100, and each UE may be stationary or mobile. A UE may also be referred to as a mobile station, a terminal, an access terminal, a subscriber unit, a station, a Customer Premises Equipment (CPE), a cellular phone, a smart phone, a personal digital assistant (PDA), a wireless modem, a wireless communication device, a handheld device, a laptop computer, a cordless phone, a wireless local loop (WLL) station, a tablet computer, a camera, a gaming device, a netbook, a smartbook, an ultrabook, an appliance, a medical device or medical equipment, a biometric sensor/device, a wearable device such as a smart watch, smart clothing, smart glasses, a smart wrist band, smart jewelry (e.g., a smart ring, a smart bracelet, etc.), an entertainment device (e.g., a music device, a video device, a satellite radio, etc.), a vehicular component or sensor, a smart meter/sensor, industrial manufacturing equipment, a global positioning system device, or any other suitable device that is configured to communicate via a wireless or wired medium. Some UEs may be considered machine-type communication (MTC) devices or evolved MTC (eMTC) devices. MTC and eMTC UEs include, for example, robots, drones, remote devices, sensors, meters, monitors, location tags, etc., that may communicate with a BS, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, which may be narrowband IoT (NB-IoT) devices.

Certain wireless networks (e.g., LTE) utilize orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kHz and the minimum resource allocation (called a "resource block" (RB)) may be 12 subcarriers (or 180 kHz). Consequently, the nominal Fast Fourier Transfer (FFT) size may be equal to 128, 256, 512, 1024 or 2048 for system bandwidth of 1.25, 2.5, 5, 10, or 20 megahertz (MHz), respectively. The system bandwidth may also be partitioned into subbands. For example, a subband may cover 1.08 MHz (i.e., 6 resource blocks), and there may be 1, 2, 4, 8, or 16 subbands for system bandwidth of 1.25, 2.5, 5, 10 or 20 MHz, respectively.

While aspects of the examples described herein may be associated with LTE technologies, aspects of the present disclosure may be applicable with other wireless communications systems, such as NR. NR may utilize OFDM with a CP on the uplink and downlink and include support for half-duplex operation using TDD. Beamforming may be supported and beam direction may be dynamically configured. MIMO transmissions with precoding may also be supported. MIMO configurations in the DL may support up to 8 transmit antennas with multi-layer DL transmissions up to 8 streams and up to 2 streams per UE. Multi-layer transmissions with up to 2 streams per UE may be supported. Aggregation of multiple cells may be supported with up to 8 serving cells.

In some examples, access to the air interface may be scheduled, wherein a. A scheduling entity (e.g., a base station) allocates resources for communication among some or all devices and equipment within its service area or cell. The scheduling entity may be responsible for scheduling, assigning, reconfiguring, and releasing resources for one or more subordinate entities. That is, for scheduled communication, subordinate entities utilize resources allocated by the scheduling entity. Base stations are not the only entities that may function as a scheduling entity. In some examples, a UE may function as a scheduling entity and may schedule resources for one or more subordinate entities (e.g., one or more other UEs), and the other UEs may utilize the resources scheduled by the UE for wireless communication. In some examples, a UE may function as a scheduling entity in a peer-to-peer (P2P) network, and/or in a mesh network. In a mesh network example, UEs may communicate directly with one another in addition to communicating with a scheduling entity.

In FIG. 1, a solid line with double arrows indicates desired transmissions between a UE and a serving BS, which is a BS designated to serve the UE on the downlink and/or uplink. A finely dashed line with double arrows indicates interfering transmissions between a UE and a BS.

Figure 2:
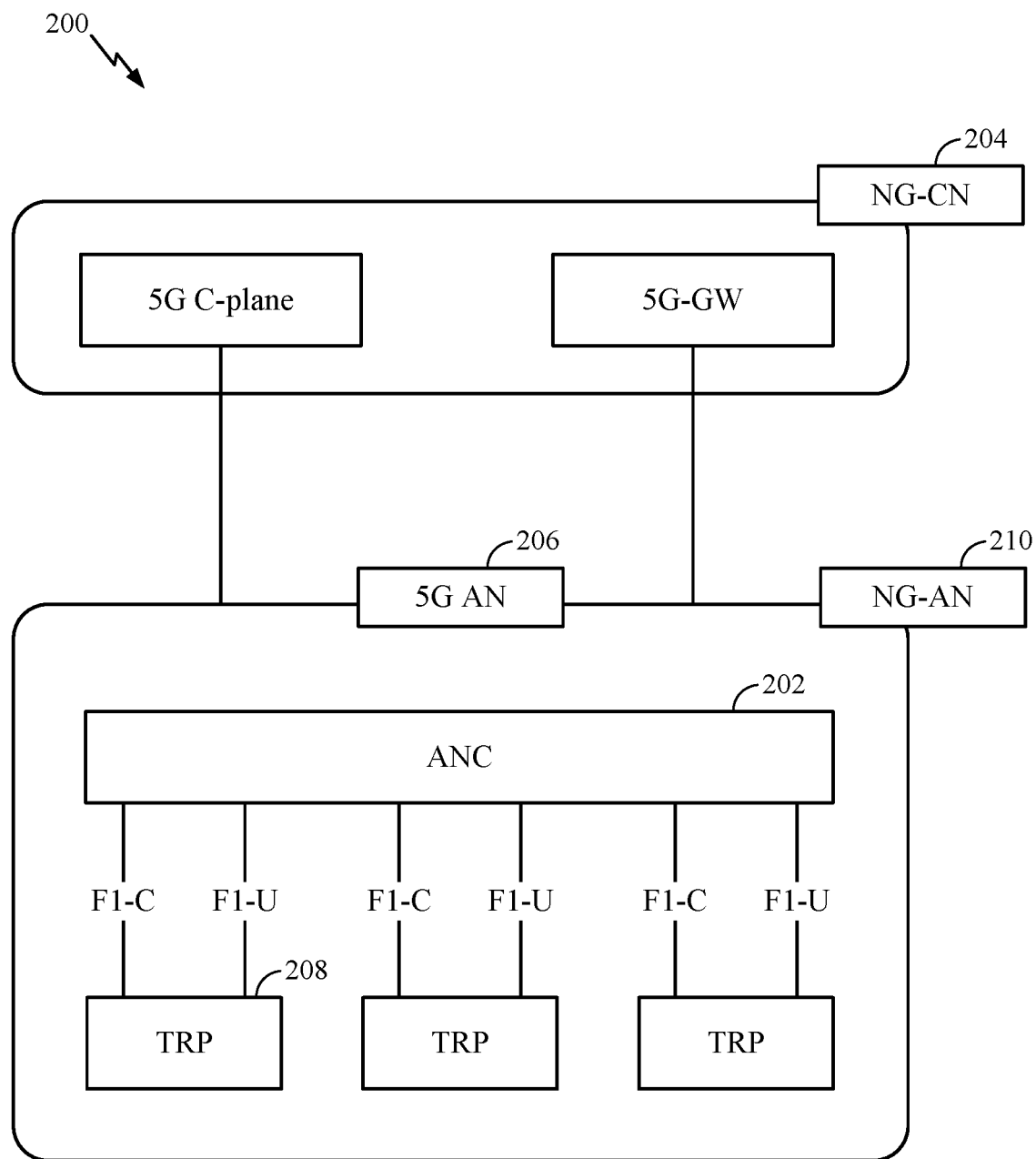
FIG. 2 is a block diagram illustrating an example logical architecture of a distributed radio access network (RAN), in accordance with certain aspects of the present disclosure.

FIG. 2 illustrates an example logical architecture of a distributed Radio Access Network (RAN) 200, which may be implemented in the wireless communication network 100 illustrated in FIG. 1. A 5G access node 206 may include an access node controller (ANC) 202. ANC 202 may be a central unit (CU) of the distributed RAN 200. The backhaul interface to the Next Generation Core Network (NG-CN) 204 may terminate at ANC 202. The backhaul interface to neighboring next generation access Nodes (NG-ANs) 210 may terminate at ANC 202. ANC 202 may include one or more transmission reception points (TRPs) 208 (e.g., cells, BSs, gNBs, etc.).

The TRPs 208 may be a distributed unit (DU). TRPs 208 may be connected to a single ANC (e.g., ANC 202) or more than one ANC (not illustrated). For example, for RAN sharing, radio as a service (RaaS), and service specific AND deployments, TRPs 208 may be connected to more than one ANC. TRPs 208 may each include one or more antenna ports. TRPs 208 may be configured to individually (e.g., dynamic selection) or jointly (e.g., joint transmission) serve traffic to a UE.

The logical architecture of distributed RAN 200 may support fronthauling solutions across different deployment types. For example, the logical architecture may be based on transmit network capabilities (e.g., bandwidth, latency, and/or jitter).

The logical architecture of distributed RAN 200 may share features and/or components with LTE. For example, next generation access node (NG-AN) 210 may support dual connectivity with NR and may share a common fronthaul for LTE and NR.

The logical architecture of distributed RAN 200 may enable cooperation between and among TRPs 208, for example, within a TRP and/or across TRPs via ANC 202. An inter-TRP interface may not be used.

Logical functions may be dynamically distributed in the logical architecture of distributed RAN 200. As will be described in more detail with reference to FIG. 5, the Radio Resource Control (RRC) layer, Packet Data Convergence Protocol (PDCP) layer, Radio Link Control (RLC) layer, Medium Access Control (MAC) layer, and a Physical (PHY) layers may be adaptably placed at the DU (e.g., TRP 208) or CU (e.g., ANC 202).

Figure 3:
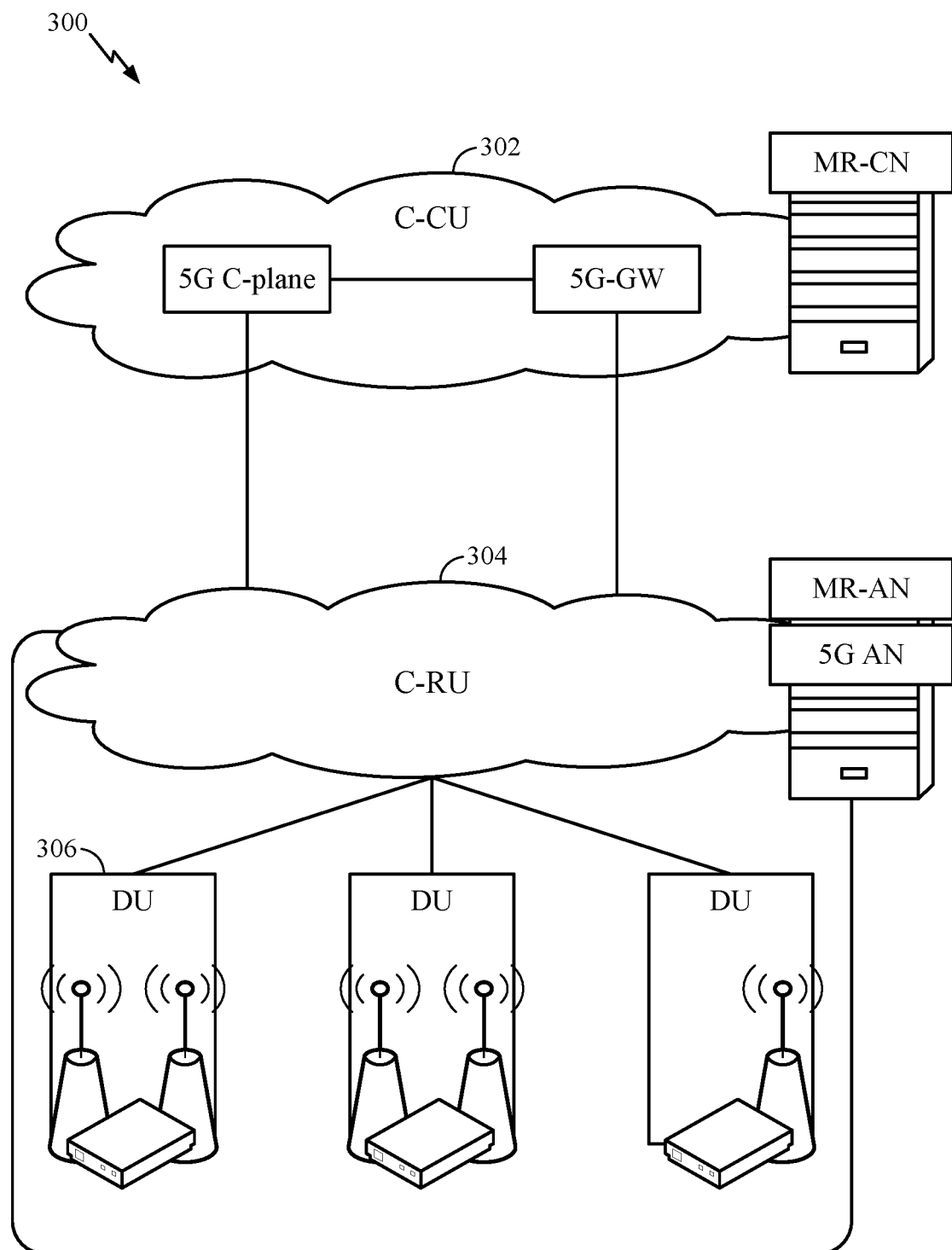
FIG. 3 is a diagram illustrating an example physical architecture of a distributed RAN, in accordance with certain aspects of the present disclosure.

FIG. 3 illustrates an example physical architecture of a distributed Radio Access Network (RAN) 300, according to aspects of the present disclosure. A centralized core network unit (C-CU) 302 may host core network functions. C-CU 302 may be centrally deployed. C-CU 302 functionality may be offloaded (e.g., to advanced wireless services (AWS)), in an effort to handle peak capacity.

A centralized RAN unit (C-RU) 304 may host one or more ANC functions. Optionally, the C-RU 304 may host core network functions locally. The C-RU 304 may have distributed deployment. The C-RU 304 may be close to the network edge.

A DU 306 may host one or more TRPs (Edge Node (EN), an Edge Unit (EU), a Radio Head (RH), a Smart Radio Head (SRH), or the like). The DU may be located at edges of the network with radio frequency (RF) functionality.

Figure 4:
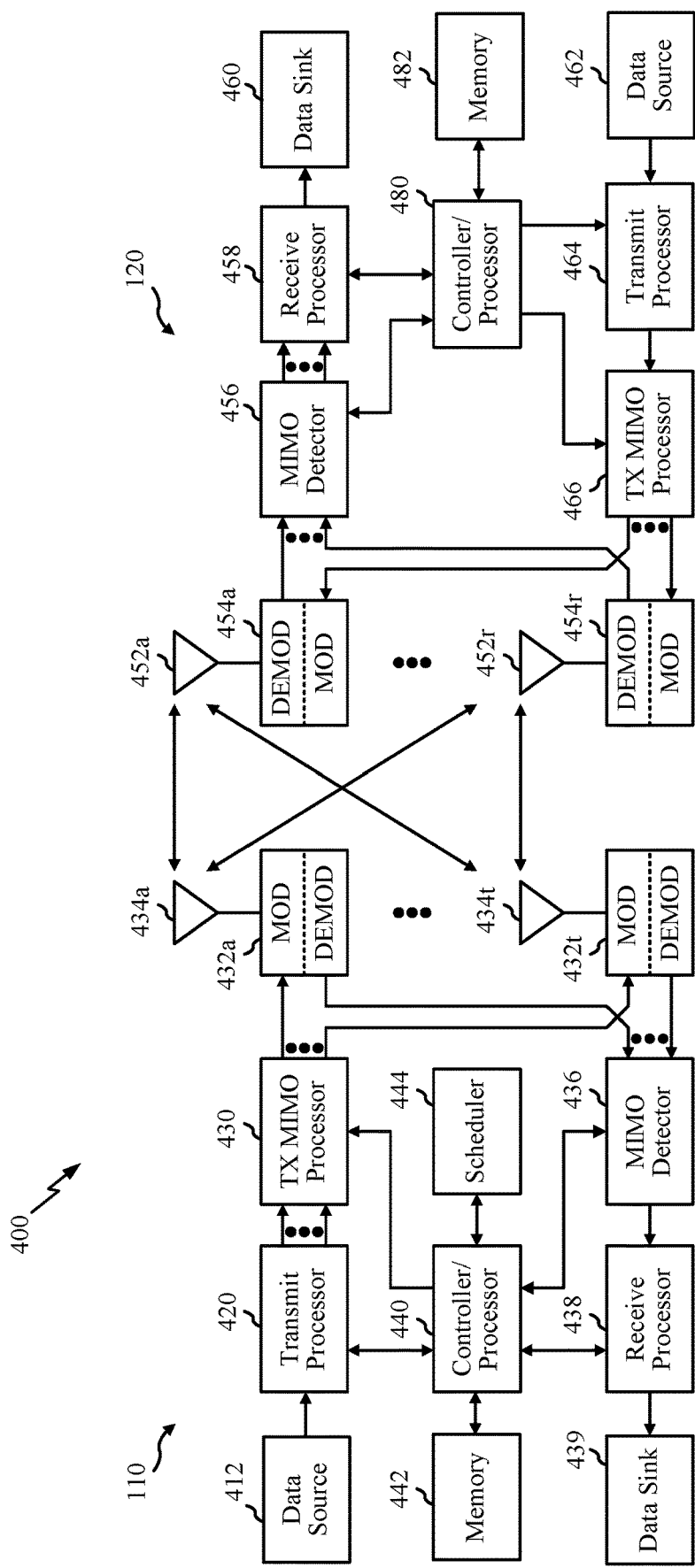
FIG. 4 is a block diagram conceptually illustrating a design of an example base station (BS) and user equipment (UE), in accordance with certain aspects of the present disclosure.

FIG. 4 illustrates example components of BS 110 and UE 120 (as depicted in FIG. 1), which may be used to implement aspects of the present disclosure. For example, antennas 452, processors 466, 458, 464, and/or controller/processor 480 of the UE 120 and/or antennas 434, processors 420, 460, 438, and/or controller/processor 440 of the BS 110 may be used to perform the various techniques and methods described herein.

At the BS 110, a transmit processor 420 may receive data from a data source 412 and control information from a controller/processor 440. The control information may be for the physical broadcast channel (PBCH), physical control format indicator channel (PCFICH), physical hybrid ARQ indicator channel (PHICH), physical downlink control channel (PDCCH), group common PDCCH (GC PDCCH), etc. The data may be for the physical downlink shared channel (PDSCH), etc. The processor 420 may process (e.g., encode and symbol map) the data and control information to obtain data symbols and control symbols, respectively. The processor 420 may also generate reference symbols, e.g., for the primary synchronization signal (PSS), secondary synchronization signal (SSS), and cell-specific reference signal (CRS). A transmit (TX) multiple-input multiple-output (MIMO) processor 430 may perform spatial processing (e.g., precoding) on the data symbols, the control symbols, and/or the reference symbols, if applicable, and may provide output symbol streams to the modulators (MODs) 432a through 432t. Each modulator 432 may process a respective output symbol stream (e.g., for OFDM, etc.) to obtain an output sample stream. Each modulator may further process (e.g., convert to analog, amplify, filter, and upconvert) the output sample stream to obtain a downlink signal. Downlink signals from modulators 432a through 432t may be transmitted via the antennas 434a through 434t, respectively.

At the UE 120, the antennas 452a through 452r may receive the downlink signals from the base station 110 and may provide received signals to the demodulators (DEMODs) in transceivers 454a through 454r, respectively. Each demodulator 454 may condition (e.g., filter, amplify, downconvert, and digitize) a respective received signal to obtain input samples. Each demodulator may further process the input samples (e.g., for OFDM, etc.) to obtain received symbols. A MIMO detector 456 may obtain received symbols from all the demodulators 454a through 454r, perform MIMO detection on the received symbols if applicable, and provide detected symbols. A receive processor 458 may process (e.g., demodulate, deinterleave, and decode) the detected symbols, provide decoded data for the UE 120 to a data sink 460, and provide decoded control information to a controller/processor 480.

On the uplink, at UE 120, a transmit processor 464 may receive and process data (e.g., for the physical uplink shared channel (PUSCH)) from a data source 462 and control information (e.g., for the physical uplink control channel (PUCCH) from the controller/processor 480. The transmit processor 464 may also generate reference symbols for a reference signal (e.g., for the sounding reference signal (SRS)). The symbols from the transmit processor 464 may be precoded by a TX MIMO processor 466 if applicable, further processed by the demodulators in transceivers 454a through 454r (e.g., for SC-FDM, etc.), and transmitted to the base station 110. At the BS 110, the uplink signals from the UE 120 may be received by the antennas 434, processed by the modulators 432, detected by a MIMO detector 436 if applicable, and further processed by a receive processor 438 to obtain decoded data and control information sent by the UE 120. The receive processor 438 may provide the decoded data to a data sink 439 and the decoded control information to the controller/processor 440.

The controllers/processors 440 and 480 may direct the operation at the base station 110 and the UE 120, respectively. The processor 440 and/or other processors and modules at the BS 110 may perform or direct the execution of processes for the techniques described herein. The memories 442 and 482 may store data and program codes for BS 110 and UE 120, respectively. A scheduler 444 may schedule UEs for data transmission on the downlink and/or uplink.

Figure 5:
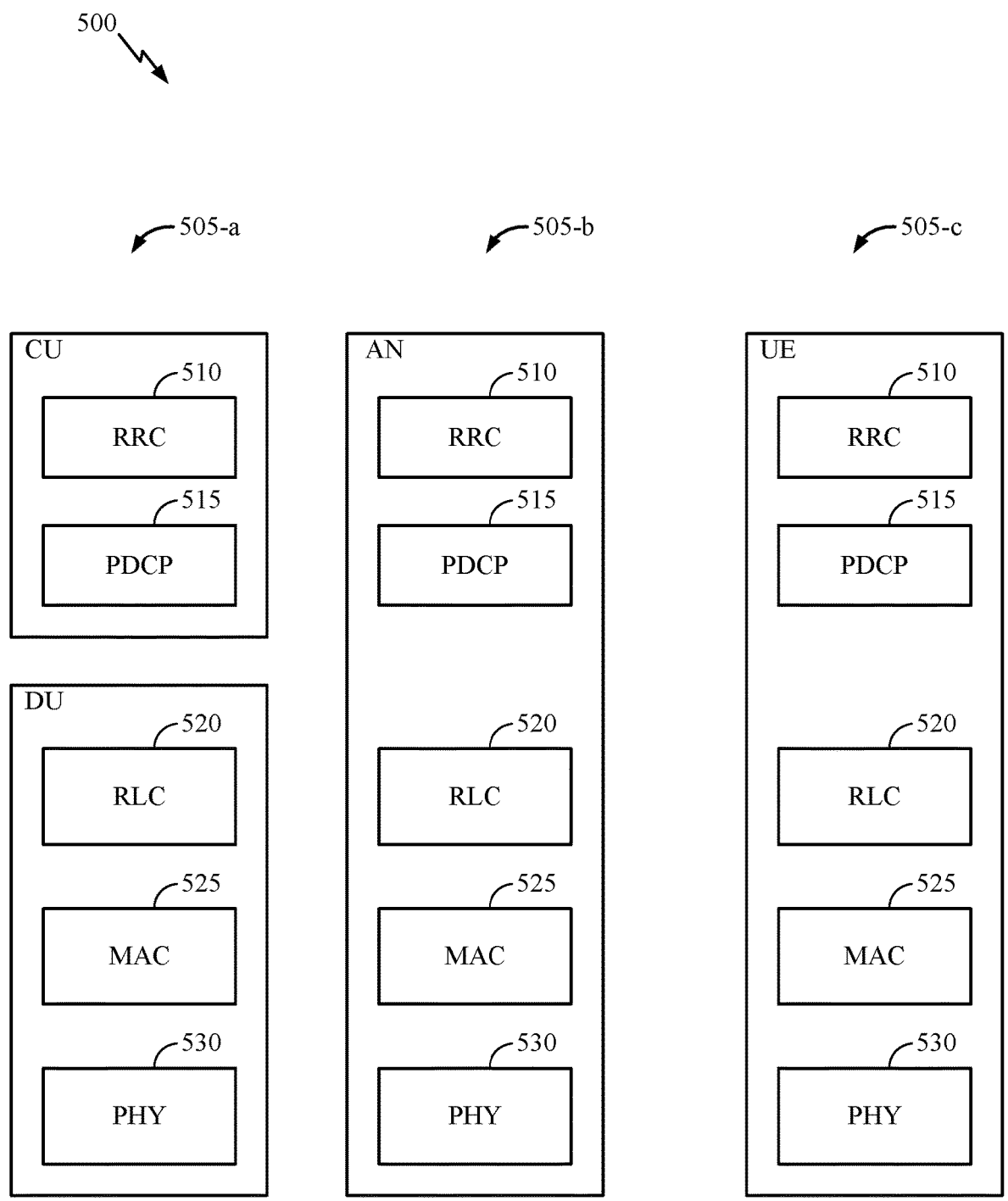
FIG. 5 is a diagram showing examples for implementing a communication protocol stack, in accordance with certain aspects of the present disclosure.

FIG. 5 illustrates a diagram 500 showing examples for implementing a communications protocol stack, according to aspects of the present disclosure. The illustrated communications protocol stacks may be implemented by devices operating in a wireless communication system, such as a 5G system (e.g., a system that supports uplink-based mobility). Diagram 500 illustrates a communications protocol stack including a Radio Resource Control (RRC) layer 510, a Packet Data Convergence Protocol (PDCP) layer 515, a Radio Link Control (RLC) layer 520, a Medium Access Control (MAC) layer 525, and a Physical (PHY) layer 530. In various examples, the layers of a protocol stack may be implemented as separate modules of software, portions of a processor or ASIC, portions of non-collocated devices connected by a communications link, or various combinations thereof. Collocated and non-collocated implementations may be used, for example, in a protocol stack for a network access device (e.g., ANs, CUs, and/or DUs) or a UE.

A first option 505-a shows a split implementation of a protocol stack, in which implementation of the protocol stack is split between a centralized network access device (e.g., an ANC 202 in FIG. 2) and distributed network access device (e.g., DU 208 in FIG. 2). In the first option 505-a, an RRC layer 510 and a PDCP layer 515 may be implemented by the central unit, and an RLC layer 520, a MAC layer 525, and a PHY layer 530 may be implemented by the DU. In various examples the CU and the DU may be collocated or non-collocated. The first option 505-a may be useful in a macro cell, micro cell, or pico cell deployment.

A second option 505-b shows a unified implementation of a protocol stack, in which the protocol stack is implemented in a single network access device. In the second option, RRC layer 510, PDCP layer 515, RLC layer 520, MAC layer 525, and PHY layer 530 may each be implemented by the AN. The second option 505-b may be useful in, for example, a femto cell deployment.

Regardless of whether a network access device implements part or all of a protocol stack, a UE may implement an entire protocol stack as shown in 505-c (e.g., the RRC layer 510, the PDCP layer 515, the RLC layer 520, the MAC layer 525, and the PHY layer 530).

In LTE, the basic transmission time interval (TTI) or packet duration is the 1 ms subframe. In NR, a subframe is still 1 ms, but the basic TTI is referred to as a slot. A subframe contains a variable number of slots (e.g., 1, 2, 4, 8, 16, ... slots) depending on the subcarrier spacing. The NR RB is 12 consecutive frequency subcarriers. NR may support a base subcarrier spacing of 15 KHz and other subcarrier spacing may be defined with respect to the base subcarrier spacing, for example, 30 kHz, 60 kHz, 120 kHz, 240 kHz, etc. The symbol and slot lengths scale with the subcarrier spacing. The CP length also depends on the subcarrier spacing.

Figure 6:
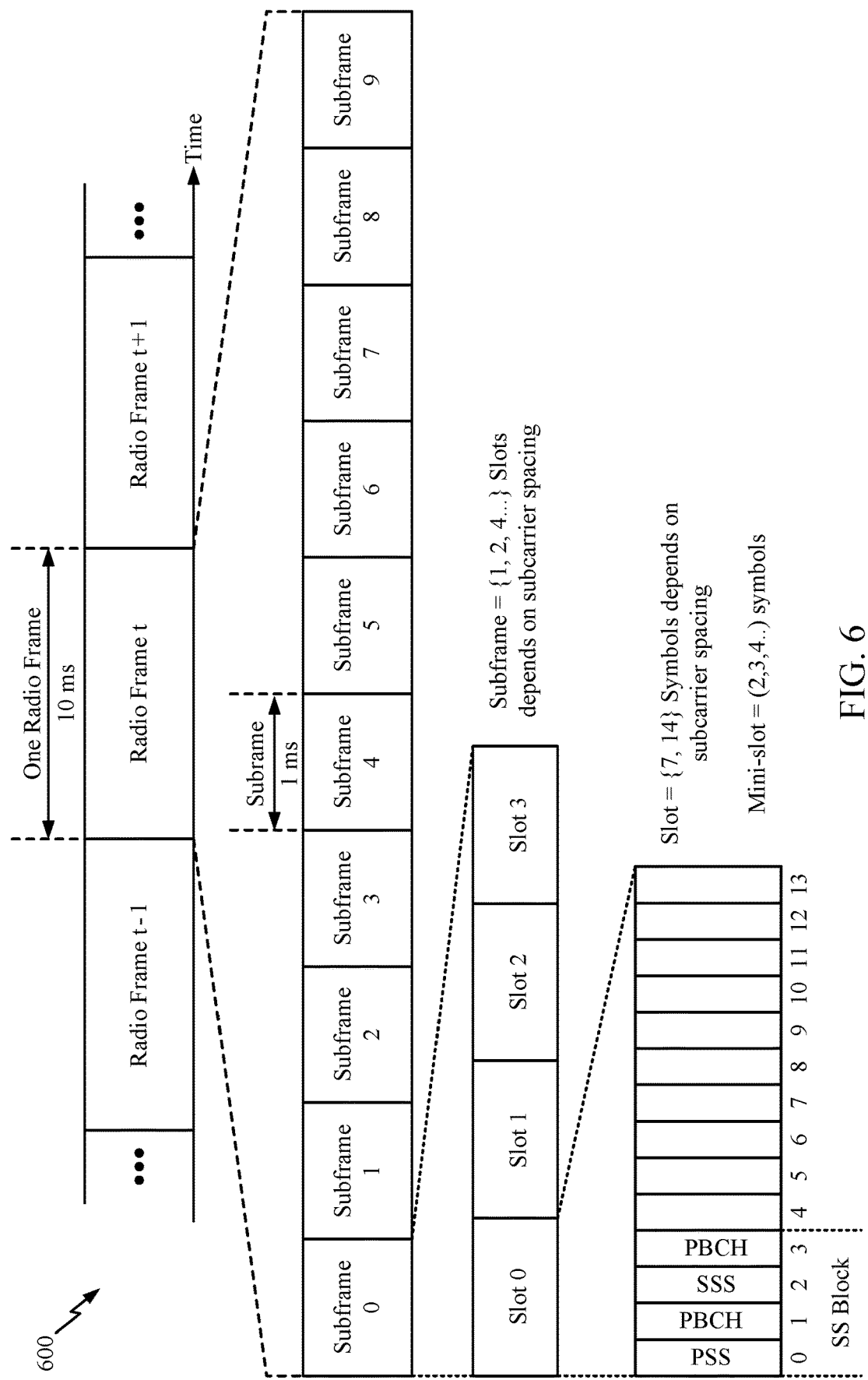
FIG. 6 illustrates an example of a frame format for a new radio (NR) system, in accordance with certain aspects of the present disclosure.

FIG. 6 is a diagram showing an example of a frame format 600 for NR. The transmission timeline for each of the downlink and uplink may be partitioned into units of radio frames. Each radio frame may have a predetermined duration (e.g., 10 ms) and may be partitioned into 10 subframes, each of 1 ms, with indices of 0 through 9. Each subframe may include a variable number of slots depending on the subcarrier spacing. Each slot may include a variable number of symbol periods (e.g., 7 or 14 symbols) depending on the subcarrier spacing. The symbol periods in each slot may be assigned indices. A mini-slot, which may be referred to as a sub-slot structure, refers to a transmit time interval having a duration less than a slot (e.g., 2, 3, or 4 symbols).

Each symbol in a slot may indicate a link direction (e.g., DL, UL, or flexible) for data transmission and the link direction for each subframe may be dynamically switched. The link directions may be based on the slot format. Each slot may include DL/UL data as well as DL/UL control information.

In NR, a synchronization signal (SS) block is transmitted. The SS block includes a PSS, a SSS, and a two symbol PBCH. The SS block can be transmitted in a fixed slot location, such as the symbols 0-3 as shown in FIG. 6. The PSS and SSS may be used by UEs for cell search and acquisition. The PSS may provide half-frame timing, the SS may provide the CP length and frame timing. The PSS and SSS may provide the cell identity. The PBCH carries some basic system information, such as downlink system bandwidth, timing information within radio frame, SS burst set periodicity, system frame number, etc. The SS blocks may be organized into SS bursts to support beam sweeping. Further system information such as, remaining minimum system information (RMSI), system information blocks (SIBs), other system information (OSI) can be transmitted on a physical downlink shared channel (PDSCH) in certain subframes.

In some circumstances, two or more subordinate entities (e.g., UEs) may communicate with each other using sidelink signals. Real-world applications of such sidelink communications may include public safety, proximity services, UE-to-network relaying, vehicle-to-vehicle (V2V) communications, Internet of Everything (IoE) communications, IoT communications, mission-critical mesh, and/or various other suitable applications. Generally, a sidelink signal may refer to a signal communicated from one subordinate entity (e.g., UE1) to another subordinate entity (e.g., UE2) without relaying that communication through the scheduling entity (e.g., UE or BS), even though the scheduling entity may be utilized for scheduling and/or control purposes. In some examples, the sidelink signals may be communicated using a licensed spectrum (unlike wireless local area networks, which typically use an unlicensed spectrum).

A UE may operate in various radio resource configurations, including a configuration associated with transmitting pilots using a dedicated set of resources (e.g., a radio resource control (RRC) dedicated state, etc.) or a configuration associated with transmitting pilots using a common set of resources (e.g., an RRC common state, etc.). When operating in the RRC dedicated state, the UE may select a dedicated set of resources for transmitting a pilot signal to a network. When operating in the RRC common state, the UE may select a common set of resources for transmitting a pilot signal to the network. In either case, a pilot signal transmitted by the UE may be received by one or more network access devices, such as an AN, or a DU, or portions thereof. Each receiving network access device may be configured to receive and measure pilot signals transmitted on the common set of resources, and also receive and measure pilot signals transmitted on dedicated sets of resources allocated to the UEs for which the network access device is a member of a monitoring set of network access devices for the UE. One or more of the receiving network access devices, or a CU to which receiving network access device(s) transmit the measurements of the pilot signals, may use the measurements to identify serving cells for the UEs, or to initiate a change of serving cell for one or more of the UEs.

Example Feedback Mode Indication for Coordinated Transmission

Aspects of the present disclosure provide apparatus, methods, processing systems, and computer program products that enable a UE to select different acknowledgment/negative (ACK/NACK) feedback modes for different types of coordinated transmission modes. In certain aspects, a UE can communicate with a plurality of TRPs at the same time, or at different times (e.g., in a non-coherent/non-transparent manner (i.e., non-coherent joint transmission (NCJT)).

Figure 7:
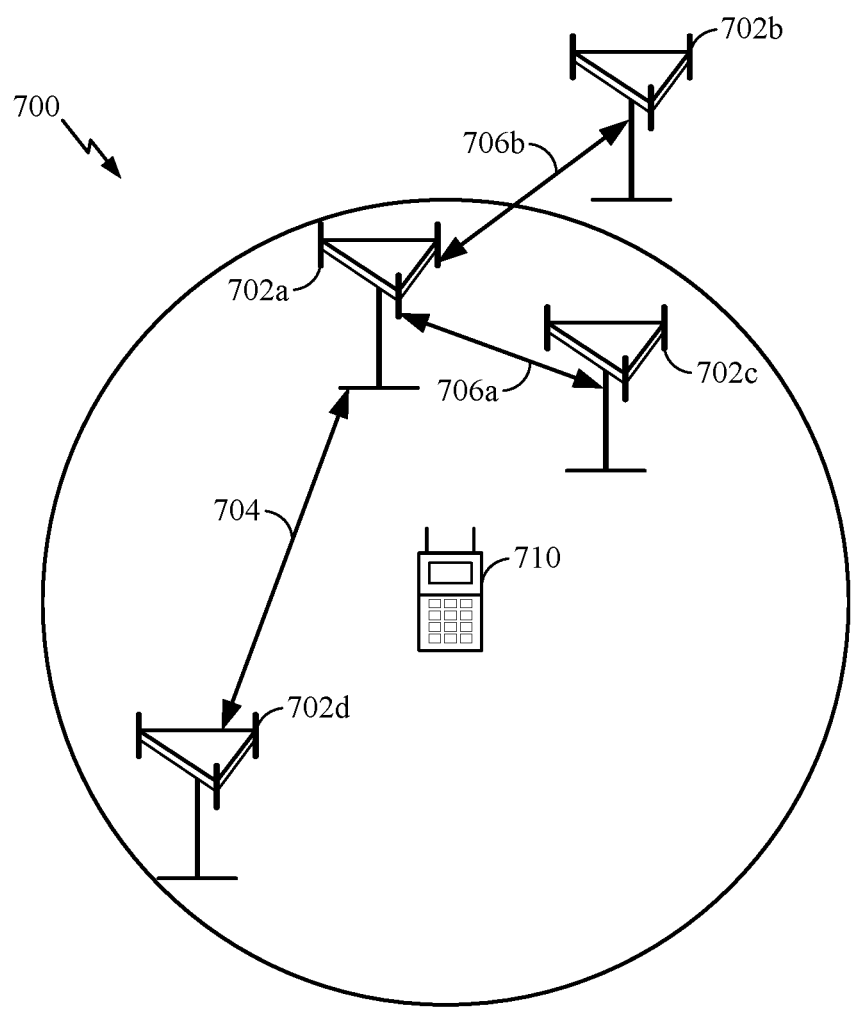
FIG. 7 is a block diagram conceptually illustrating an example wireless communication system, in accordance with certain aspects of the present disclosure.

FIG. 7 depicts a wireless communication system 700 in accordance with certain aspects of the disclosure. FIG. 7 includes a UE 710 and a plurality of transmission reception points (TRPs) 702a-702d (or collectively TRPs 702). TRPs 702 may be coupled by a network controller (not shown) to provide coordination and control for TRPs 702. The network controller may communicate with the TRPs 702 via a backhaul. The TRPs 702 may also communicate with one another (e.g., directly or indirectly) via wireless or wireline backhaul.

In certain aspects, a backhaul condition is indicative of a high performance backhaul or indicative of low performance backhaul. A backhaul condition is indicative of a high performance backhaul when the capacity of the backhaul between TRPs (e.g., backhaul 706a coupling TRP 702a and TRP 702c) is not substantially constrained (e.g., backhaul 706a has substantially unlimited capacity) and the latency between TRPs (e.g., TRP 702a and TRP 702c) is substantially low (e.g., less than about 1 millisecond).

A backhaul condition is indicative of a low performance backhaul when the capacity of the backhaul between TRPs (e.g., backhaul 704 coupling TPR 702a and TRP 702d) is constrained (e.g., backhaul 704 has a substantially limited capacity) and the latency between TRPs (e.g., TPR 702a and TRP 702d) is not substantially low (e.g., greater than about 5 milliseconds). It will be appreciated that in certain aspects, a UE (e.g., UE 710) may be in communication with more than one TRP (e.g., TRP 702a, 702c, and 702d) and the backhaul condition may be indicative of a mixed backhaul condition (e.g., a first backhaul 704 is indicative of a low performance backhaul between TRP 702a and 702d, and a second backhaul 706a is indicative of a high performance backhaul between TRP 702a and 702d). In certain aspects, when a backhaul condition is indicative of a mixed backhaul condition, the backhaul condition is treated as a low performance backhaul. In some cases, a UE may be signaled certain parameters indicative of the backhaul condition (e.g., an actual backhaul delay experienced between TRPs and/or some other parameter indicative of delay).

In certain aspects, multiple coordinated transmission modes may be used by a UE (e.g., UE 710) to communicate coordinated transmissions with a plurality of TRPs (e.g., TRP 702a, 702c, and 702d). It will be appreciated that the UE may first receive a configuration message (e.g., a radio resource control (RRC) message) that in part configures the UE to communicate coordinated transmissions with the plurality of TRPs. In other aspects, the UE may be preconfigured to communicate coordinated transmissions with the plurality of TRPs.

Aspects of the present disclosure provide ACK/NACK (HARQ-ACK) feedback modes that may be suitable for different backhaul conditions. The ACK/NACK feedback modes described herein may be used with a variety of different coordinated transmission modes. While certain example coordinated transmission modes are described in accordance with aspects of the present disclosure (e.g., the six coordinated transmission modes described below) this disclosure can apply to other transmission modes.

A first coordinated transmission mode (or first mode) may be used when a physical downlink control channel (PDCCH) and a physical downlink shared channel (PDSCH) are sent from a plurality of TRPs (e.g., TRP 702a and TRP 702c) to a UE (e.g., UE 710), and the PDSCH includes different spatial layers from different TRPs (e.g., a first spatial layer from TRP 702a and a second spatial layer from TRP 702c).

A second coordinated transmission mode (or second mode) may be used when a first PDCCH, a second PDCCH, a first PDSCH, and a second PDSCH are transmitted from different TRPs (e.g., TRP 702a and TRP 702c, or TRP 702a and TRP 702d) to a UE (e.g., UE 710), and each of the first PDSCH and a second PDSCH carry different transport blocks.

A third coordinated transmission mode (or third mode) may be used when a first PDCCH, a second PDCCH, a first PDSCH, and a second PDSCH are transmitted from different TRPs (e.g., TRP 702a and TRP 702c) to a UE (e.g., UE 710), and the first PDSCH and the second PDSCH carry the same transport block. This transmission mode may be interpreted as PDSCH repetition.

A fourth coordinated transmission mode (or fourth mode) may be used when a PDCCH repetition is sent from the plurality of TRPs (e.g., TRP 702a and TRP 702c) to a UE (e.g., UE 710), wherein multiple PDCCHs are transmitted from different TRPs (e.g., multiple PDCCHs from TRP 702a and multiple PDCCHs from TRP 702c), and each of the PDCCHs carry the same downlink control information and schedule for a PDSCH.

A fifth coordinated transmission mode (or fifth mode) may be used when a PDCCH, a first PDSCH, and a second PDSCH are transmitted from different TRPs (e.g., TRP 702a and TRP 702c) to a UE (e.g., UE 710), and the first PDSCH and the second PDSCH carry the same transport block. In this transmission mode, the first PDSCH and the second PDSCH are both scheduled by the PDCCH.

A sixth coordinated transmission mode (or sixth mode) may be used when a PDCCH, a first PDSCH, and a second PDSCH are transmitted from different TRPs (e.g., TRP 702a and TRP 702c) to a UE (e.g., UE 710), and the first PDSCH and the second PDSCH carry different transport blocks. In this transmission mode, the first PDSCH and the second PDSCH are both scheduled by the PDCCH.

Figure 8:
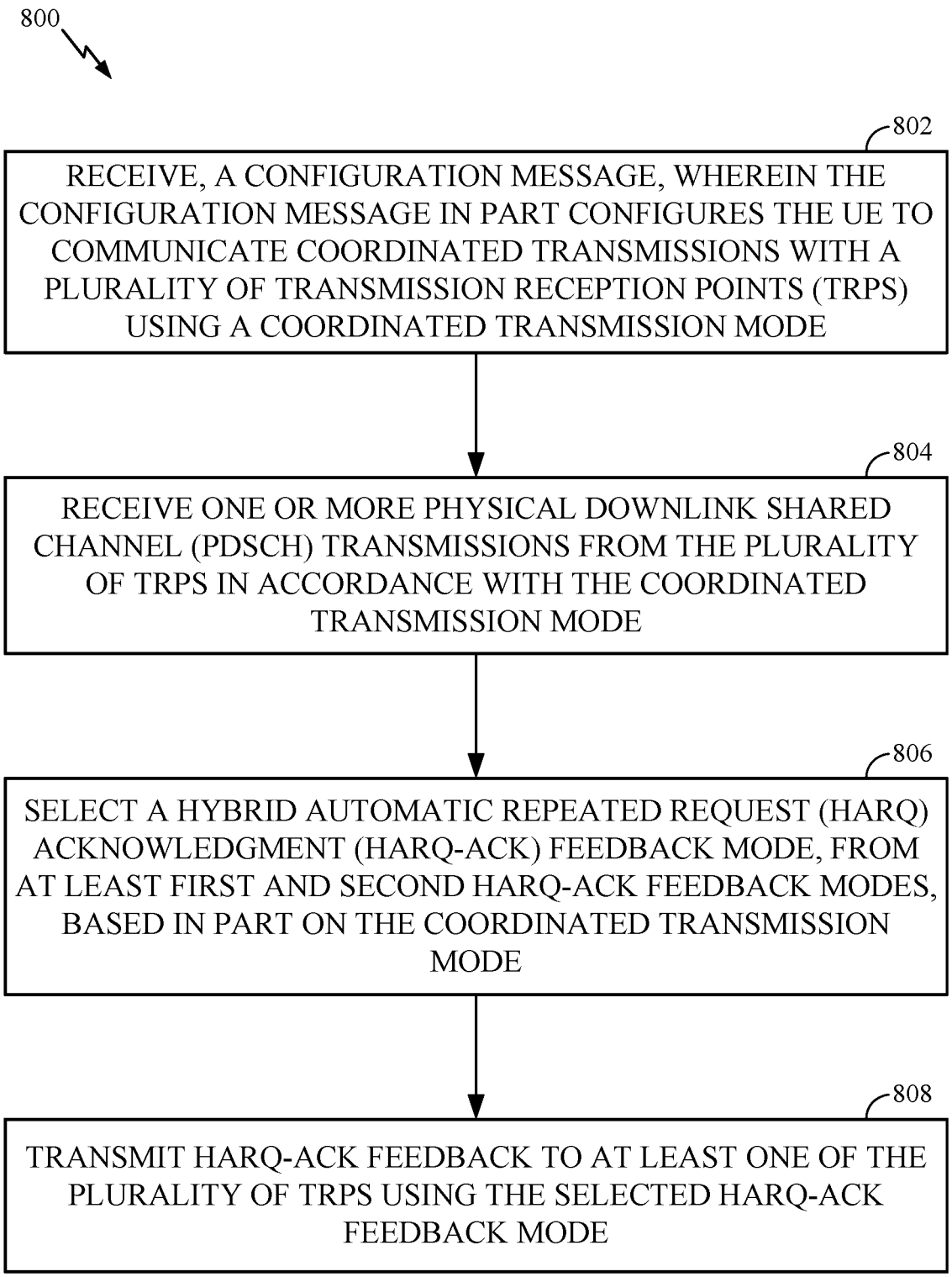
FIG. 8 is a flow diagram for an example feedback system in accordance with certain aspects of the disclosure.

FIG. 8 shows example operations 800 of a method of wireless communication performed at a user equipment (UE) in accordance with certain aspects of the disclosure. Operations 800 may be performed, for example, by UE 710 in FIG. 7, to select an ACK/NACK feedback mode based for coordinate transmissions from multiple TRPs.

Operations 800 begin, at 802, by receiving a configuration message, wherein the configuration message in part configures the UE to communicate coordinated transmissions with a plurality of TRPs (e.g., TRPs 702 in FIG. 7) using a coordinated transmission mode.

At 804, the UE receives one or more physical downlink shared channel (PDSCH) transmissions from the plurality of TRPs in accordance with the coordinated transmission mode.

At 806, the UE selects a hybrid automatic repeated request (HARD) Acknowledgment (HARQ-ACK) feedback mode based in part on a coordinated transmission mode (e.g., one of a first mode, a second mode a third mode, a fourth mode, a fifth mode, or a sixth mode).

At 808, the UE transmits HARQ-ACK feedback to at least one of the plurality of TRPs using the selected HARQ-ACK feedback mode.

Figure 9:
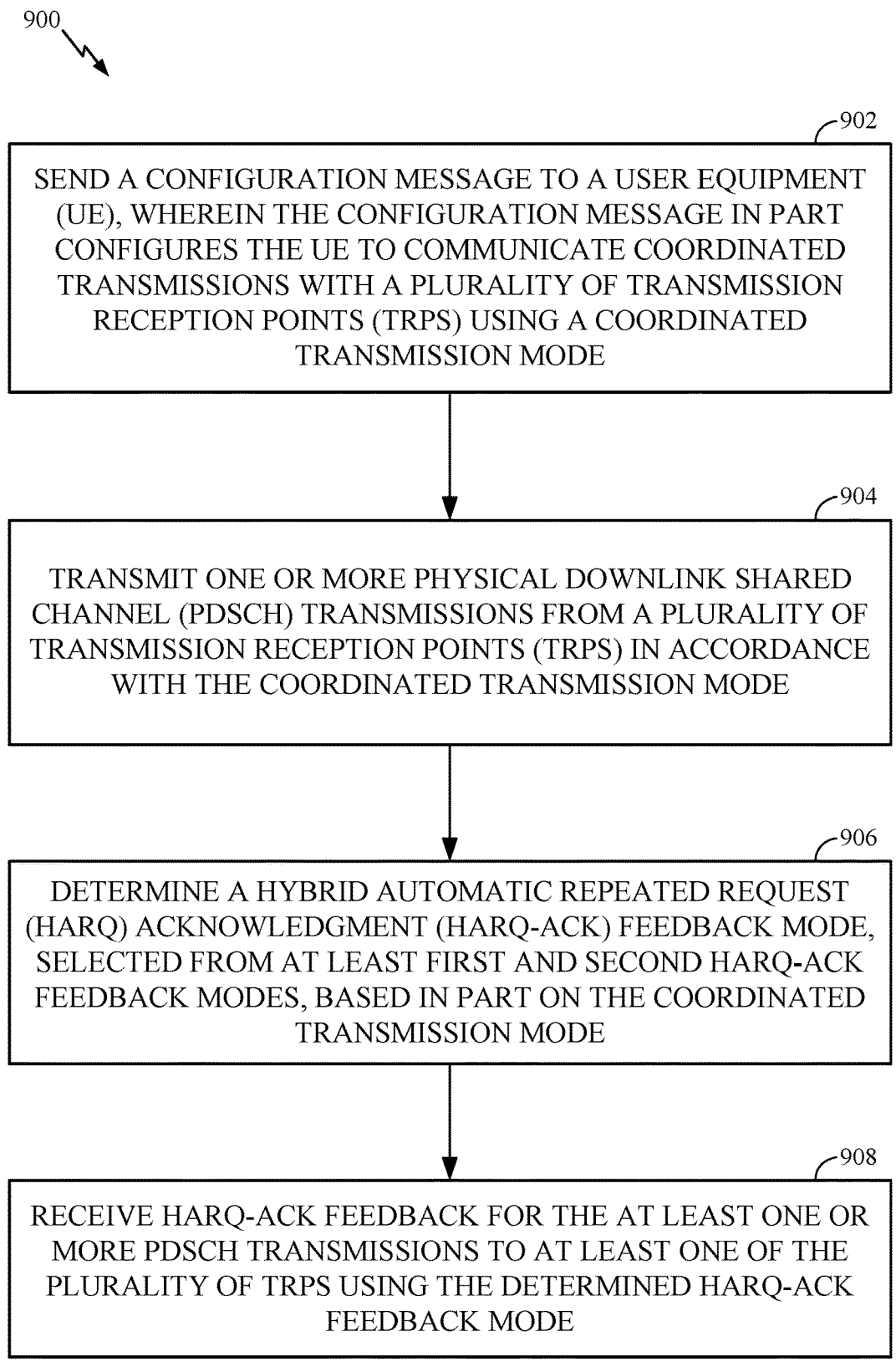
FIG. 9 is a flow diagram for an example feedback system in accordance with certain aspects of the disclosure.

FIG. 9 shows example operations 900 of a method of wireless communication performed at a network entity, in accordance with certain aspects of the disclosure. Operations 900 may be performed, for example, by a TRP 702 in FIG. 7 (or network entity in control thereof), to configure (communicate with) a UE performing operations 800 of FIG. 8.

Operations 900 begin, at 902, by sending a configuration message to a user equipment (UE), wherein the configuration message in part configures the UE to communicate coordinated transmissions with a plurality of transmission reception points (TRPs) using a coordinated transmission mode.

At 904, the network entity transmits one or more physical downlink shared channel (PDSCH) transmissions from a plurality of transmission reception points (TRPs) in accordance with the coordinated transmission mode.

At 906, the network entity determines a hybrid automatic repeated request (HARD) Acknowledgment (HARQ-ACK) feedback mode, selected from at least first and second HARQ-ACK feedback modes, based in part on the coordinated transmission mode.

At 908, the network entity receives HARQ-ACK feedback for the at least one or more PDSCH transmissions to at least one of the plurality of TRPs using the determined HARQ-ACK feedback mode.

In certain aspects, a HARQ-ACK feedback mode may be one of a first ACK/NACK feedback mode (e.g., a joint HARQ-ACK feedback mode) or a second ACK/NACK feedback mode (e.g., a separate HARQ-ACK feedback mode). A joint feedback mode is characterized by using either a joint ACK/NACK feedback across a plurality of TRPs (e.g., using a joint codebook) or by multiplexing one or more ACK/NACK (HARQ-ACK) feedbacks (e.g., wherein each is generated from one or more codebooks) into a joint transmission. In some cases, when the UE generates the ACK/NACK feedback(s) for the received PDSCH transmissions, it may first determine the TRP from which the PDSCH(s) are transmitted. Based on this determination, it may then generate a first codebook (including ACK/NACKs). In some cases, the UE may generate two HARQ-ACK codebooks and transmit both of them to both of the TRPs.

In certain aspects, when the coordinated transmission mode is one of the first mode, fourth mode, third mode, fifth mode, or sixth mode, the joint feedback mode is used. In certain aspects, the UE determines to use the joint feedback mode based in part on determining that the coordinated transmission mode indicated in the configuration message in block 802 is one of a first mode, fourth mode, third mode, fifth mode, or sixth mode is configured. It will be appreciated that the joint feedback mode may be used when there is a high performance backhaul condition between all TRPs.

In certain aspects, a separate feedback mode is characterized by separate ACK/NACK feedback for each TRP (e.g., using a separate codebook for each TRP to generate an ACK/NACK for each respective TRP). For example, a UE may receive PDSCH from different TRPs, determines the TRP(s) from which the PDSCHs are transmitted. Based on this determination, the UE may generate separate HARQ-ACK codebooks for HARQ-ACK feedbacks corresponding to the respective PDSCHs. The UE may then feed back the respective HARQ-ACK codebooks separately to each TRP, In certain aspects, when a UE is configured with a certain coordinated transmission mode (e.g. the second mode), both the joint feedback mode and the separate feedback mode may be used.

In certain aspects (e.g., when the UE is configured for the second mode), when a backhaul condition is indicative of a high performance backhaul the joint feedback mode is used, and the separate feedback mode is used when a backhaul condition is indicative of low performance backhaul. In certain aspects, when a backhaul condition is indicative of a mixed backhaul condition of high performance backhaul and low performance backhaul, the TRPs may be clustered into several groups, wherein the TRPs within each group are connected via high performance backhauls, and the TRPs in different groups may be connected via low performance backhauls. In this case, separate feedback mode is used towards each group of groups of TRPs, and a joint feedback mode is used for ACK/NACK feedback to TRPs within the same group.

In certain aspects (e.g., when the UE is configured for the second mode), the UE may receive in a configuration message (e.g., a RRC message) and select the ACK/NACK feedback mode based in part on information contained in the RRC message (e.g., information indicative of a joint feedback mode or a separate feedback mode).

In certain aspects (e.g., when the UE is configured for the second mode), the UE may receive in a configuration message, wherein the configuration message in part indicates at least one downlink control information (DCI) indicative of a first codebook. In this case, the UE may receive at least one DCI from at least one of a plurality of the TRPs and select a codebook based on the at least one DCI. The UE may generate ACK/NACK feedback from the indicated codebook and transmit the generated ACK/NACK feedback to the plurality of the TRPs.

It will be appreciated that in certain aspects, the DCI may be configured with a field for information indicative of a first codebook, but in certain cases, this field is not configured in the DCI. When the UE determined that the field remains unused, it uses a joint feedback mode. When the UE determined that the filed is not configured in the DCI, it may use a separate feedback mode. It will be further appreciated that the field for information indicative of a codebook, which in certain aspects is a hybrid automatic repeated request (HARD) codebook indicator, is a new field which may be configured in a DCI.

In certain aspects, the at least one DCI may be indicative of a first feedback mode (e.g., a joint feedback mode) or a second feedback mode (e.g., a separate feedback mode). In this case, the UE may select the first feedback mode or the second feedback mode based in part on the DCI. For example, the DCI may be indicative of a first codebook and the first codebook is indicative of the second ACK/NACK feedback mode, thus the UE selects the second feedback mode (e.g., a separate feedback mode).

It will be appreciated that there are static (or semi-static codebooks) (e.g., a codebook where the size of the codebook does not change during transmissions) and dynamic codebooks (e.g., a codebook where number of ACK/NACK bits in each ACK/NACK feedback may vary from transmission to transmission, and the number of ACK/NACK bits is signaled in a DCI via the DAI (downlink assignment indicator) field)). It will be further appreciated that in accordance with certain aspects of the disclosure, ACK/NACK feedback from both semi-static codebooks and dynamic codebooks are supported. It other aspects, ACK/NACK feedback from only semi-static codebooks or dynamic codebooks are supported.

In certain aspects, the UE may autonomously determine an ACK/NACK feedback mode based on one or more configuration parameters (e.g., number of codebooks, codebook sizing, codebook information, etc.) indicative of a joint feedback mode or a separate feedback mode. For example, a UE may be configured with a single semi-static code book or multiple semi-static code books. In certain aspects, when the UE is configured with a single semi-static codebook, the UE implicitly determines to use a joint feedback mode. In other aspects, a UE may implicitly determine to use a separate feedback mode when the UE is configured with multiple semi-static codebooks.

In certain aspects (e.g., when the UE is configured for the second mode), and the UE selects the second feedback mode (e.g., a separate feedback mode), the UE may determine a PUCCH transmission resource for at least one ACK/NACK feedback. For example, when the UE determines a first PUCCH transmission to a first TRP and a second PUCCH transmission to a second TRP are scheduled on the same PUCCH resource, the UE can generate a first ACK/NACK feedback from a first codebook and a second ACK/NACK feedback from a second codebook. The UE can then multiplex the first ACK/NACK feedback and the second ACK/NACK feedback (e.g., a first number of bits X are used for the first TRP and a second number of bits Y are used for the second TRP (e.g., where X and Y are in certain aspects each a RRC configured size). The UE may then transmit the multiplexed ACK/NACK feedback to the plurality of TRPs on the PUCCH resource (e.g., based on a pre-determined (semi-static) order, with a size (e.g., number of ACK/NACK bits) that equals the sum of size of the multiplexed ACK/NACK feedback).

In certain aspect, after multiplexing, the PUCCH may need to be transmitted on a different resource than the scheduled PUCCH resource (e.g., due to a change in payload size (e.g., comparing either X or Y to X+Y)). In other aspects, the network may configure PUCCH resource sets and the codebook sizes such that a resource change is not needed (e.g., a PUCCH resource for X is sufficient for X+Y). It will be appreciated that the first TRP and the second TRP may detect (e.g., using blind detection) and determine if there is more than one codebook (e.g., based in part on one or more codebook size) to determine information specific to each TRP.

In certain aspects, (e.g., when the UE is configured for the second mode), UE may be configured with multiple semi-static codebooks, one for ACK/NACK feedback to each TRP. In addition, the size of each semi-static codebook may be different (e.g., corresponding to X and Y discussed above). Thus, it will be appreciated a TRP can determine if there is a multiplexed transmission using codebook sizes information.

For example, when a first codebook size X and a second codebook size Y are based on different semi-static codebooks, wherein X is a different size than Y, then a TRP can determine the first codebook size X is associated with a TRP A and the second codebook size Y is associated with a TRP B. It will be appreciated that semi-static coordination between the TRPs (e.g., each TRP can access information indicative of each of the different codebooks associated with each TRP) is used by a TRP to determine the codebook sizes associated with one or more other TRPs.

In certain aspects (e.g., when the UE is configured for the third mode), the UE receives a first PDCCH from a first TRP associated with a first DCI, and the UE receives a second PDCCH from a second TRP associated with a second DCI, wherein each DCI is indicative of transmission of the same transport block (TB). In this case, the UE may be constrained to only use one PUCCH for ACK/NACK feedback corresponding to the TB.

In certain aspects, when the two DCI's do not contain the same information associated with ACK/NACK feedback (e.g., slot timing value (k1), downlink assignment index (DAI), ACK/NACK resource indicator (ARI) values, etc.), the UE is configured to treat this as an error case and refrain from sending ACK/NACK feedback to the first or second TRP. In other aspects, when two DCI's do not contain the same information (e.g., k1, DAI, ARI values, etc.), the UE may select one of the DCI's to determine the PUCCH resources. For example, the UE may select one of the DCIs based on a DCI order, a DCI aggregation level, or a control resource set identification (CORESET ID). For example, UE may follow the indication in the last DCI in accordance with the order of the PDCCH monitoring occasion, in order to determine the information (e.g., k1, DAI, ARI value). In another example, the UE may follow the indication in the DCI that is received in a particular CORSET (e.g., based on CORSET ID).

In certain aspects (e.g., when the UE is configured for the second or third mode), the UE can select a physical uplink control channel (PUCCH) resource based in part on the index of one or more control channel elements (CCE) in the one or more PDCCHs. In this case, the UE may transmit ACK/NACK feedback on the selected PUCCH resource.

In other aspects, the UE selects the PUCCH resource based on at least one of a CCE order, a PDCCH monitoring occasion order, a PDCCH aggregation level, or a control resource set identification (CORESET ID). In certain aspects, a CCE order is an ordering of the CCE according to the resource block index and OFDM symbol index. It will be appreciated that in certain aspects, a PDCCH monitoring occasion order is an ordering of PDCCH monitoring occasions based on a cell ID and search space ID for the UE to monitor PDCCH. For example, UE may determine to use the starting CCE of the PDCCH detected in the last PDCCH monitoring occasion in accordance with the PDCCH monitoring occasion order to derive a PUCCH resource. It will be appreciated that this can resolve a potential ambiguity for the starting CCE used to derive a PUCCH resource when a UE receives two PDCCHs to jointly trigger one ACK/NACK feedback. Thus, in this case, a UE can determine the PUCCH resource even when implicit mapping is used for PUCCH resource identification.

Figure 10:
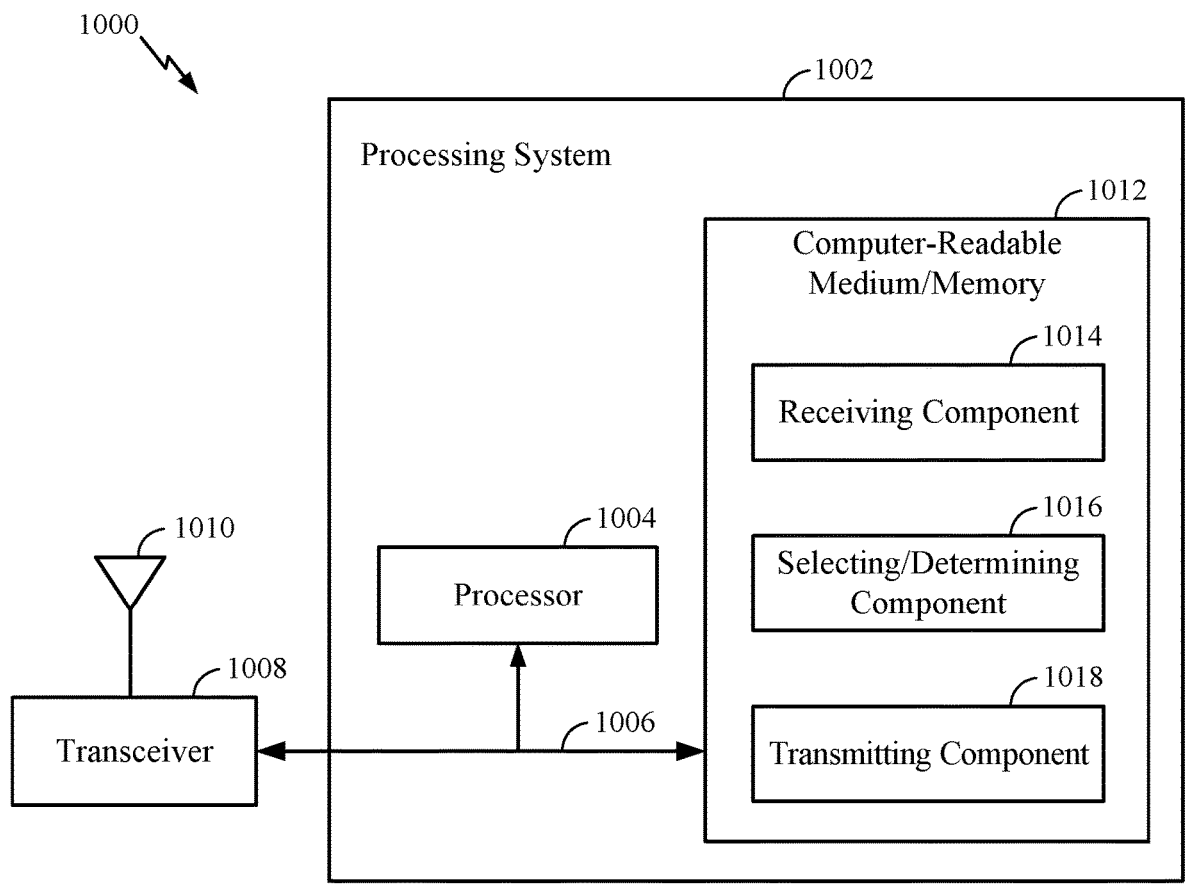
FIG. 10 illustrates a communications device that may include various components configured to perform operations for the techniques disclosed herein in accordance with aspects of the present disclosure.

FIG. 10 illustrates a communications device 1000 that may include various components (e.g., corresponding to means-plus-function components) configured to perform operations for the techniques disclosed herein, such as the operations illustrated in FIG. 8 and/or FIG. 9. The communications device 1000 includes a processing system 1002 coupled to a transceiver 1008. The transceiver 1008 is configured to transmit and receive signals for the communications device 1000 via an antenna 1010, such as the various signal described herein. The processing system 1002 may be configured to perform processing functions for the communications device 1000, including processing signals received and/or to be transmitted by the communications device 1000.

The processing system 1002 includes a processor 1004 coupled to a computer-readable medium/memory 1012 via a bus 1006. In certain aspects, the computer-readable medium/memory 1012 is configured to store instructions that when executed by processor 1004, cause the processor 1004 to perform the operations illustrated in FIG. 8 and/or FIG. 9, or other operations for performing the various techniques discussed herein.

In certain aspects, the processing system 1002 further includes a receiving component 1014 for performing the operations illustrated in FIG. 8 blocks 802 and 804 (or FIG. 9 block 908). Additionally, the processing system 1002 includes a selecting/determining component 1016 for performing the operations illustrated in FIG. 8 block 806 (or FIG. 9 block 906). Additionally, the processing system 1002 includes a transmitting component 1018 for performing the operations illustrated in FIG. 8 block 808 (or FIG. 9 blocks 902 and 904).

The receiving component 1014, selecting component 1016, and transmitting component 1018 may be coupled to the processor 1004 via bus 1006. In certain aspects, the receiving component 1014, selecting component 1016, and transmitting component 1018 may be hardware circuits. In certain aspects, the receiving component 1014, selecting component 1016, and transmitting component 1018 may be software components that are executed and run on processor 1004.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U. S.C. § 112(f) unless the element is expressly recited using the phrase "means for" or, in the case of a method claim, the element is recited using the phrase "step for."

The various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user terminal 120 (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein. For example, instructions for performing the operations described herein and illustrated in FIG. 8.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above.

Various modifications, changes and variations may be made in the arrangement, operation and details of the methods and apparatus described above without departing from the scope of the claims.

What is claimed is:

1. A method for wireless communication by a user equipment (UE), comprising:
   receiving a first configuration message and a second configuration message, wherein:
      the first configuration message, in part, configures the UE to communicate coordinated transmissions with a plurality of transmission reception points (TRPs) using a coordinated transmission mode,
      the second configuration message includes an indication of a first hybrid automatic repeated request acknowledgment (HARQ-ACK) feedback mode or a second HARQ-ACK feedback mode, and
      the first configuration message and the second configuration message are radio resource control (RRC) messages;
   receiving one or more physical downlink shared channel (PDSCH) transmissions from the TRPs in accordance with the coordinated transmission mode;
   selecting a HARQ-ACK feedback mode, from at least the first HARQ-ACK feedback and second HARQ-ACK feedback mode, based on the indication in the second configuration message; and
   transmitting HARQ-ACK feedback for the at least one or more PDSCH transmissions to at least one of the plurality of TRPs using the selected HARQ-ACK feedback mode.

2. The method of claim 1, wherein:
   the first HARQ-ACK feedback mode comprises a joint HARQ-ACK feedback mode; and
   the second HARQ-ACK feedback mode comprises a separate HARQ-ACK feedback mode.

3. The method of claim 2, further comprising:
   generating HARQ-ACK feedback using a joint codebook when the first HARQ-ACK feedback mode is selected; and
   transmitting the generated HARQ-ACK feedback to the plurality of TRPs.

4. The method of claim 2, further comprising generating a first HARQ-ACK feedback from a first codebook and a second HARQ-ACK feedback from a second codebook when the second HARQ-ACK feedback mode is selected.

5. The method of claim 4, further comprising transmitting the first HARQ-ACK feedback to a first TRP, and the second HARQ-ACK feedback to a second TRP.

6. The method of claim 4, wherein the first codebook is a semi-static codebook of a first size and the second codebook is a semi-static codebook of a second size that is different from the first size.

7. The method of claim 1, wherein the coordinated transmission mode is one of:
   a first mode comprising a physical downlink control channel (PDCCH) and a PDSCH, wherein the PDSCH comprises different spatial layers from different TRPs; or
   a second mode comprising a first PDCCH, a second PDCCH, a first PDSCH and a second PDSCH, wherein the first PDSCH is transmitted from a first TRP, and the second PDSCH is transmitted from a second TRP, and the first PDSCH and the second PDSCH carry different transport blocks (TBs).

8. The method of claim 7, wherein:
   when the coordinated transmission mode is one of a first set of transmission modes including the first mode, selecting the HARQ feedback mode comprises selecting the first HARQ-ACK feedback mode; and
   when the coordinated transmission mode is one of a second set of transmission modes including the second mode, selecting the HARQ feedback mode comprises selecting comprises selecting the first HARQ-ACK feedback mode or the second HARQ-ACK feedback mode based at least in part on one or more parameters.

9. The method of claim 8, wherein:
   the one or more parameters indicate a backhaul condition; and
   when the parameters indicate a high performance backhaul condition, selecting the HARQ feedback mode comprises selecting the first HARQ-ACK feedback mode, and when the one or more parameters indicate a low performance backhaul condition, selecting the HARQ feedback mode comprises selecting the second HARQ-ACK feedback mode.

10. The method of claim 1, wherein the configuration message in part indicates at least one downlink control information (DCI) indicative of a first codebook and the method comprises:
    receiving at least one DCI from at least one of the plurality of TRPs;
    selecting the first codebook based on the at least one DCI;
    generating HARQ-ACK feedback from the first codebook; and
    transmitting the HARQ-ACK feedback to the plurality of TRPs.

11. The method of claim 10, wherein the at least one DCI is indicative of the first HARQ-ACK feedback mode or the second HARQ-ACK feedback mode.

12. The method of claim 11, wherein:
    when the at least one DCI is indicative of a first codebook and the first codebook is indicative of the second HARQ-ACK feedback mode, selecting the HARQ feedback mode comprises selecting the second HARQ-ACK feedback mode.

13. The method of claim 10, further comprising:
    when two or more of the at least one DCI contain different information, selecting one of the DCIs based on a DCI order, DCI aggregation level, or control resource set identification (CORESET ID), wherein transmitting HARQ-ACK feedback is based on information contained in the selected DCI.

14. The method of claim 1, further comprising:
    selecting a physical uplink control channel (PUCCH) resource based in part on an index of one or more control channel elements (CCE) in one or more physical downlink control channel (PDCCHs), wherein transmitting the HARQ-ACK feedback comprises transmitting the HARQ-ACK feedback on the selected PUCCH resource.

15. A method for wireless communication by a network entity, comprising:
    sending a first configuration message and a second configuration message to a user equipment (UE), wherein:
       the first configuration message, in part, configures the UE to communicate coordinated transmissions with a plurality of transmission reception points (TRPs) using a coordinated transmission mode,
       the second configuration message includes an indication of a first hybrid automatic repeated request acknowledgment (HARQ-ACK) feedback mode or a second HARQ-ACK feedback mode, and the first configuration message and the second configuration message are radio resource control (RRC) messages;
transmitting one or more physical downlink shared channel (PDSCH) transmissions from the plurality of TRPs in accordance with the coordinated transmission mode;
determining a HARQ-ACK feedback mode, selected from at least the first HARQ-ACK feedback mode and second HARQ-ACK feedback mode, based on the indication in the second configuration message; and
receiving HARQ-ACK feedback for the at least one or more PDSCH transmissions to at least one of the plurality of TRPs using the determined HARQ-ACK feedback mode.

16. The method of claim 15, wherein:
the first HARQ-ACK feedback mode comprises a joint HARQ-ACK feedback mode; and
the second HARQ-ACK feedback mode comprises a separate HARQ-ACK feedback mode.

17. The method of claim 16, wherein the HARQ-ACK feedback is based a joint codebook when the first HARQ-ACK feedback mode is selected.

18. The method of claim 15, wherein the coordinated transmission mode is one of:
a first mode comprising a physical downlink control channel (PDCCH) and a PDSCH, wherein the PDSCH comprises different spatial layers from different TRPs; or
a second mode comprising a first PDCCH, a second PDCCH, a first PDSCH and a second PDSCH, wherein the first PDSCH is transmitted from a first TRP, and the second PDSCH is transmitted from a second TRP, and the first PDSCH and the second PDSCH carry different transport blocks (TBs).

19. The method of claim 18, wherein:
when the coordinated transmission mode is one of a first set of transmission modes including the first mode, determining the HARQ-ACK feedback mode comprises selecting the first HARQ-ACK feedback mode; and
when the coordinated transmission mode is one of a second set of transmission modes including the second mode, determining the HARQ-ACK feedback mode comprises selecting the first HARQ-ACK feedback mode or the second HARQ-ACK feedback mode based at least in part on one or more parameters provided to the UE.

20. The method of claim 19, wherein:
the one or more parameters indicate a backhaul condition; and
when the parameters indicate a high performance backhaul condition, determining the HARQ-ACK feedback mode comprises selecting the first HARQ-ACK feedback mode, and when the parameters indicate a low performance backhaul condition, determining the HARQ-ACK feedback mode comprises selecting the second HARQ-ACK feedback mode.

21. The method of claim 15, wherein the configuration message in part indicates at least one downlink control information (DCI) indicative of a first codebook.

22. The method of claim 21, wherein the at least one DCI is indicative of the first HARQ-ACK feedback mode or the second HARQ-ACK feedback mode.

23. The method of claim 22, wherein:
when the at least one DCI is indicative of a first codebook and the first codebook is indicative of the second HARQ-ACK feedback mode, determining the HARQ-ACK feedback mode comprises the second HARQ-ACK feedback mode.

24. The method of claim 15, further comprising:
determining a physical uplink control channel (PUCCH) resource based in part on an index of one or more control channel elements (CCE) in one or more physical downlink control channels (PDCCHs); and
monitoring the determined PUCCH resource for the HARQ-ACK feedback.

25. An apparatus for wireless communication, comprising:
at least one processor coupled with a memory and configured to:
receive a first configuration message and a second configuration message, wherein:
the first configuration message, in part, configures a user equipment (UE) to communicate coordinated transmissions with a plurality of transmission reception points (TRPs) using a coordinated transmission mode,
the second configuration message includes an indication of a first hybrid automatic repeated request acknowledgment (HARQ-ACK) feedback mode or a second HARQ-ACK feedback mode, and
the first configuration message and the second configuration message are radio resource control (RRC) messages;
receive one or more physical downlink shared channel (PDSCH) transmissions from the plurality of TRPs in accordance with the coordinated transmission mode;
select a HARQ-ACK feedback mode, from at least first HARQ-ACK feedback mode and the second HARQ-ACK feedback mode, based on the indication in the second configuration message; and
transmit HARQ-ACK feedback for the at least one or more PDSCH transmissions to at least one of the plurality of TRPs using the selected HARQ-ACK feedback mode.

26. The apparatus of claim 25, wherein:
the first HARQ-ACK feedback mode comprises a joint HARQ-ACK feedback mode; and
the second HARQ-ACK feedback mode comprises a separate HARQ-ACK feedback mode.

27. An apparatus for wireless communication, comprising:
at least one processor coupled with a memory and configured to:
send a first configuration message and a second configuration message to a user equipment (UE), wherein:
the first configuration message, in part, configures the UE to communicate coordinated transmissions with a plurality of transmission reception points (TRPs) using a coordinated transmission mode,
the second configuration message includes an indication of a first hybrid automatic repeated request acknowledgment (HARQ-ACK) feedback mode or a second HARQ-ACK feedback mode, and
the first configuration message and the second configuration message are radio resource control (RRC) messages;
transmit one or more physical downlink shared channel (PDSCH) transmissions from the plurality of TRPs in accordance with the coordinated transmission mode;

determine a HARQ-ACK feedback mode, selected from at least a first HARQ-ACK feedback mode and a second HARQ-ACK feedback mode, based on the indication in the second configuration message; and
receive HARQ-ACK feedback for the at least one or more PDSCH transmissions to at least one of the plurality of TRPs using the determined HARQ-ACK feedback mode.

* * * * *